United States Patent Office 2,707,708
Patented May 3, 1955

2,707,708

STABILIZED SOLUTIONS OF MIXTURES OF POLY-AMIDE RESINS AND EPOXY RESINS

Harold Wittcoff, Minneapolis, Minn., assignor to General Mills, Inc., a corporation of Delaware No Drawing. Application July 9, 1953,
Serial No. 367,113

3 Claims. (Cl. 260—18)

The present invention relates to stabilized solutions of mixtures of polyamide resins and epoxy resins. As disclosed in the copending application of Malcolm M. Renfrew and Harold Wittcoff, Serial No. 276,054, filed March 11, 1952, certain mixtures of polyamide resins and epoxy resins have been found to possess very desirable properties. The resins react to produce insoluble and infusible materials which have a wide variety of uses.

These mixtures of polyamide resins and epoxy resins are frequently used for coating applications, and consequently are frequently applied from solvent solutions. Separate solutions of each resin are prepared, after which the two solutions are combined for use. It has been found that the two resins react very readily and accordingly the mixed solution must be prepared relatively shortly before use. Otherwise, there is a tendency for these solutions to gel on standing. The exact mechanism of formation of these gels is somewhat obscure and may be dependent both upon the great reactivity of the two resins and their affinity for each other, and also to the somewhat limited solubility of the two resins in most solvent mixtures. Whatever the cause, the tendency for gelation has been troublesome and has made it necessary to mix only sufficient solvent solution for one day's work. If these solutions are saved for any extended period of time, the viscosity increases until the gelation phenomenon described above is observed.

It has now been found that by the inclusion of formaldehyde in the mixed solution of the two resins, it is possible to extend the life of these mixed solutions materially and to some extent it is possible also to speed up the curing time of the mixed resins.

It is, therefore, an object of the present invention to provide a stabilized solution of mixtures of polyamide resins and epoxy resins, the solution containing formaldehyde as the stabilizer.

The present invention is applicable to epoxy resins in general. These epoxy resins are complex polymeric reaction products of polyhydric phenols with polyfunctional halohydrins such as epichlorhydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups or terminal epoxy groups and terminal primary hydroxyl groups. In the complex reaction mixture the terminal epoxy groups are generally in excess of the terminal primary hydroxyl groups. Typical polyhydric phenols include resorcinol, and various bisphenols resulting from the condensation of phenol with aldehydes and ketones such as formaldehyde, acetaldehyde, acetone, methyl ethyl ketone, and the like. Resins of this type are disclosed in Greenlee Patent 2,585,115 and these resins are useful in the present invention.

The molecular weight of the epoxy resins may be controlled by the relative proportions of the reactants, as well as by the extent to which the reaction is carried on. The present invention involving the curing of these epoxy resins may be applied to all epoxy resins. The molecular weight of the resin is not critical since both very low molecular weight resins, as well as very high molecular weight resins, can be cured by this method. The properties of the cured resin compositions may, of course, vary with the molecular weight of the epoxy resin employed, as well as the nature and molecular weight of the polyamide employed.

The polyamide compositions which may be used for curing the epoxy resins are, in general, those derived from polymeric fat acids and polyalkylene polyamines. Resins of this general type are disclosed in Cowan et al. Patent 2,450,940. Typical of these polyamides are those made with polymeric fat acids and diethylene triamine. These polyamides have a relatively high amine number due to the free amine groups. The amine number is defined as the number of milligrams of potassium hydroxide equivalent to the free amine groups present in one gram of the resin. In general, resins having amine numbers within a range of 50–200 are preferred for the present purposes.

The polymeric fat acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticica, cottonseed, corn, tall, sunflower, safflower, dehydrated castor oil and the like. In the polymerization process for the preparation of the polymeric fat acids, the fatty acids with sufficient double bond functionality combine, for the most part probably by a Diels-Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed, whether the resultant polymer possesses residual unsaturation or not. The term "polymeric fat acids" as used herein is intended to include the polymerized mixture of acids obtained, which mixture usually contains a predominant portion of dimeric acids, a smaller quantity of trimeric and higher polymeric acids, and some residual monomer.

These polymeric fat acids may be reacted with a variety of polyalkylene polyamines, such as diethylene triamine, triethylene tetramine, tetraethylene pentamine, 3,3'-imino-bispropylamine, etc. The amidification reaction may be carried out under the usual conditions employed for this purpose. Polyamides of this type generally have molecular weights varying from 1,000–10,000 and are resistant to the corrosive action of water, alkali, acids, oils, greases and organic solvents. The melting points vary, depending upon the reactants and the reaction conditions. A preferred group of these low melting polyamides are derived from polymeric fat acids and diethylene triamine and melt at from 40–70° C.

The curing of the epoxy resins is effected very simply. The resins may be mixed and melted and the curing takes place at temperatures of 80–200° C. The mixture of resins may likewise be used in solution for the preparation of coatings. The polyamides are soluble in aromatic hydrocarbons such as toluene, admixed with aliphatic alcohols, such as isopropanol, n-butanol and the like. The epoxy resins are soluble principally in ketone solvents and the two resins may be separately dissolved and the solutions mixed to obtain a composition which may be cured.

There is a wide variation in the relative proportions of the polyamide resin and the epoxy resin which may be employed. The polyamide resin may be considered as the curing agent for the epoxy resin when the polyamide is employed as the minor constituent. At the same time the polyamide may be employed as the major constituent with a minor amount of epoxy resin in which it may be considered that the epoxy resin serves to cure the polyamide. Thus compositions varying from 10% epoxy resin and 90% of polyamide resin to 90% epoxy resin and 10% polyamide resin have been prepared and have desirable, though varying, properties. For example, when 10% of an epoxy resin is used with 90% of a polyamide resin derived from equimolar portions of diethylene triamine and polymeric fat acids, a cured material which is almost rubber-like in properties, is obtained. On the other hand, when 10% of the polyamide is used with 90% of the epoxy resin, a hard, highly resilient composition results. Between these extremes all other proportions are possible and the properties vary with the particular compositions. The solvent resistance and mechanical resistance of all the compositions are excellent. Since the epoxy resin may vary in the content of epoxy groups and since the polyamides may vary in number of excess amine groups, it is apparent that the properties which are obtained depend upon the relative proportions of the various functional groups present. In general, the free amine groups should be present in an amount equivalent to at least one quarter of the epoxy groups. Similarly, the epoxy groups should be present in a quantity which is equivalent to at least one quarter of the free amine groups.

The quantity of formaldehyde which may be used to stabilize the mixed solution may vary considerably. Some improvement is observed by the employment of as little as 1% of formaldehyde based on the weight of the polyamide. Frequently, however, from 5–30% is employed and preferably around 10% based on the polyamide resin is desirable. The form in which the formaldehyde is added is also not particularly critical. It may be added as paraformaldehyde or as trioxymethylene or in the polymeric form known as trioxane. Most conveniently, however, it is added as formalin, an approximately 37% aqueous solution of formaldehyde. If the solvents for the resins are properly chosen, the water in the formalin solution does not even cause cloudiness in the mixed solution. In some instances cloudiness was observed, but it was found that this cloudiness did not affect at all the drying time or the properties of the final film. Thus, for practical purposes, it is desirable to add the formaldehyde as an aqueous solution.

Where the formaldehyde is added in the smaller quantities, below 10%, the drying time of films is reduced. Larger quantities of the formaldehyde tend to produce more stable solutions but the drying times are extended somewhat over the untreated solution.

In Table I below the effect of formaldehyde on drying rates and gel times is illustrated. The polyamide resin employed was a condensation product of diethylene triamine and dimeric fatty acids. The epoxy resin employed was a condensation product of bisphenol (A) and epichlorhydrin and is known as Epon 1001, manufactured by Shell Chemical Corporation.

*Table I*

| | | | | | |
|---|---|---|---|---|---|
| Gms. Polyamide Resin (30% soln. in toluene-isopropyl alc. 1:1) | 25 | 25 | 25 | 26 | 25 |
| Gms. Epoxy Resin (30% soln. in methyl ethyl ketone-toluene 1:1) | 25 | 25 | 25 | 25 | 25 |
| Gms. Formaldehyde (37% aqueous soln.) | -------- | 0.74 | 1.11 | 1.48 | 3 |
| Drying Time of Films (Mins.) | 17 | 9 | 12 | 17 | 31 |
| Viscosity (Gardner-Holdt): | | | | | |
| Immediate | $A_4$–$A_5$ | $A_4$–$A_5$ | $A_4$–$A_5$ | $A_4$–$A_5$ | $A_3$–$A_4$ |
| 24 hours | $A_3$–$A_4$ | $A_4$ | $A_3$–$A_4$ | $A_3$–$A_4$ | $A_3$–$A_4$ |
| 4 days | $A_2$–$A_3$ | $A_2$–$A_3$ | $A_3$ | $A_3$ | $A_3$ |
| 7 days | gelled | $A_1$ | $A_2$–$A_3$ | $A_2$–$A_3$ | $A_2$–$A_3$ |
| 14 days | -------- | $Z_6$ | A–B | A–$A_1$ | $A_1$–$A_2$ |
| 17 days | -------- | gelled | D–E | B–C | A–$A_1$ |
| 27 days | -------- | -------- | gelled | gelled | D |

At higher solids concentration in the solution the effect of the formaldehyde is demonstrated by the following results in Table II. The polyamide resin and the epoxy resin are the same resins referred to above.

*Table II*

| | | |
|---|---|---|
| Gms. Polyamide Resin (50% soln. in toluene/isopropyl alcohol 1:1) | 6.25 | 6.25 |
| Gms. Epoxy Resin (50% soln. in methyl ethyl ketone/toluene (1:1) | 6.25 | 6.25 |
| Gms. Formaldehyde (37% aqueous solution) | .63 | 0 |
| Viscosity (Gardner–Holdt): | | |
| Immediate | E | E |
| 1 day | I–J | J–K |
| 2 days | Q | U–V |
| 3 days | S | Gel |
| 4 days | W–X | -------- |
| 5 days | Gel | -------- |

I claim as my invention:

1. A stabilized organic-solvent solution of an epoxy resinous material containing terminal epoxy groups and being derived by the reaction of a bisphenol with a material selected from the group consisting of glycerol dichlorhydrin and epichlorhydrin, and a polyamide derived from polymeric fat acids and diethylene triamine, the solution being stabilized by means of from 1–30% of formaldehyde based on the weight of the polyamide.

2. A stabilized organic-solvent solution of an epoxy resinous material containing terminal epoxy groups and a polyamide derived from polymeric fat acids and a polyalkylene polyamine, the solution containing from 1–30% by weight of formaldehyde based on the weight of the polyamide.

3. A stabilized organic-solvent solution of an epoxy resinous material containing terminal epoxy groups and a polyamide derived from polymeric fat acids and a polyalkylene polyamine, the solution containing approximately 10% by weight of formaldehyde based on the weight of the polyamide.

No references cited.